United States Patent [19]

Burdick et al.

[11] 3,870,333

[45] Mar. 11, 1975

[54] TRANSPORTATION CART

[76] Inventors: Steve Burdick, 15002 N. 32nd Dr., Phoenix, Ariz. 85023; Roger Picard, 8401 N. 67th Ave., No. 81, Glendale, Ariz. 85302

[22] Filed: Sept. 17, 1973

[21] Appl. No.: 397,848

[52] U.S. Cl............... 280/47.35, 182/132, 188/21, 188/74, 280/79.1
[51] Int. Cl............................................. B62b 3/00
[58] Field of Search............. 280/47.35, 47.34, 79.1; 182/15, 16, 17, 132, 127; 188/29, 74, 19, 20, 21, 22

[56] References Cited
UNITED STATES PATENTS

| | | | |
|---|---|---|---|
| 809,912 | 1/1906 | Ferris | 188/21 X |
| 1,247,056 | 11/1917 | Woolsey | 188/20 |
| 1,759,424 | 5/1930 | Strauss | 182/15 |
| 2,897,910 | 8/1959 | Steeley | 182/15 |
| 2,962,293 | 11/1960 | Malami | 182/16 X |
| 3,395,778 | 8/1968 | Shelby | 188/20 |

Primary Examiner—David Schonberg
Assistant Examiner—Michael J. Forman

[57] ABSTRACT

A transportation cart having a top surface shaped to provide a series of three distinct step forming platforms mounted on a tubular frame movably supported on stationary wheels at the back end of the cart and having swivel wheels at the front end of the cart, the cart having a handle at the back end adjacent the top step of the cart with a further shelf disposed beneath the handle intermediate the bottom side edges of the cart, and the step forming platforms each covered with a non-skid rubber surface such that a single individual may transport a plurality of articles on the platforms to the locations at which they are to be stacked on display shelves, with the individual then using the platforms in a ladder like manner to reach the uppermost display shelf for stacking the articles thereon.

3 Claims, 6 Drawing Figures

PATENTED MAR 11 1975
3,870,333
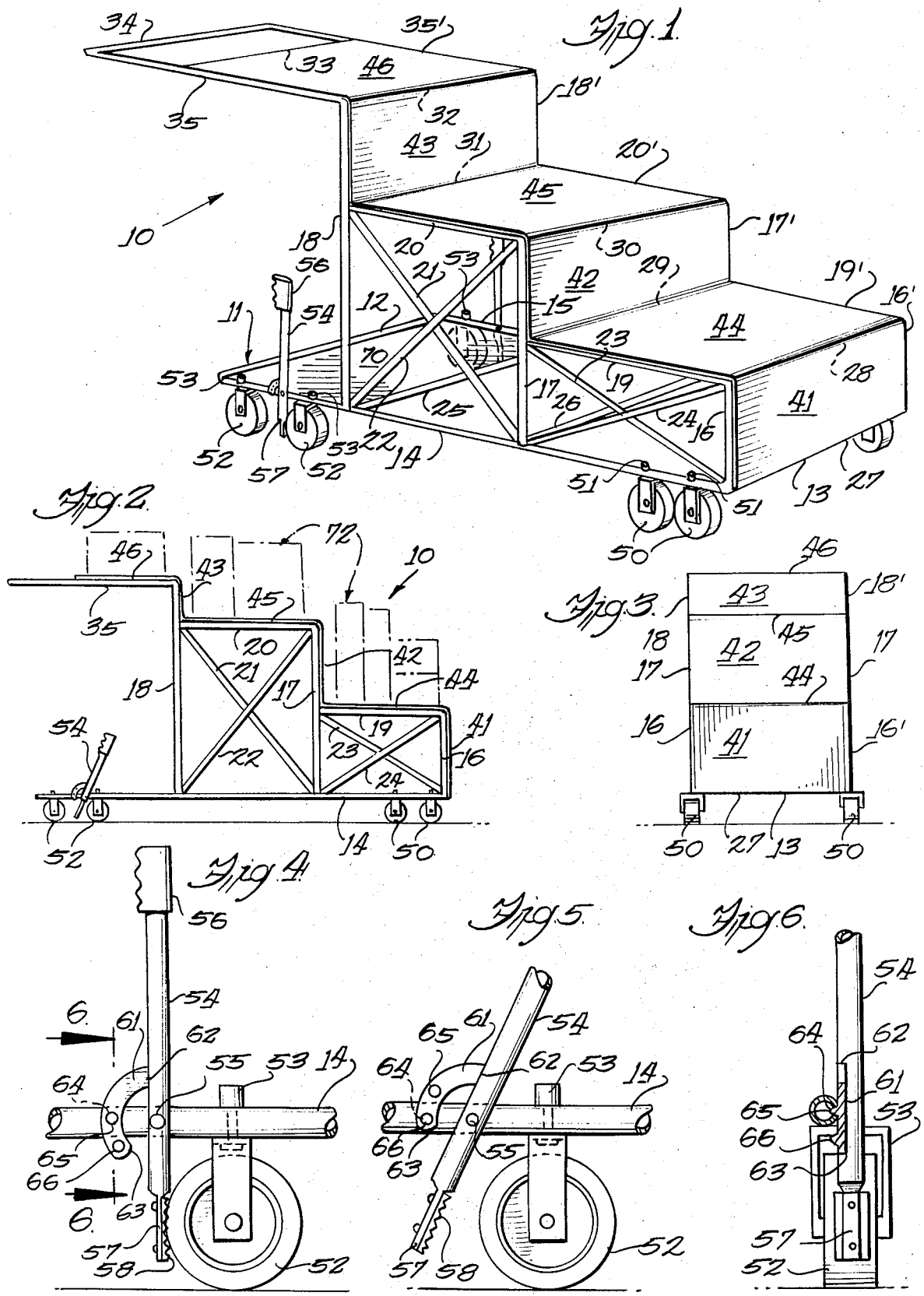

TRANSPORTATION CART

BACKGROUND OF THE INVENTION

1. Field of the Invention

This invention relates generally to carts and more particularly to a novel and improved transportation cart serving also as a ladder to provide the combined features of transporting articles to an area to be stacked and then permitting an individual to utilize the step forming platforms in a ladder like manner to reach the upper most display shelves for stacking the articles thereon.

2. Description of the Prior Art

In the stacking of articles to be sold on shelves, such as in supermarkets and the like, it is required that the articles be transported to the proper position adjacent the display racks on which they are to be stacked, after which the individual doing the stacking must then use a ladder to reach the uppermost display shelves for placing the articles thereon. In most supermarkets having a limited amount of floor space and aisle space this is a space consuming task requiring that both a cart and ladder be disposed in the aisle during the stacking and stocking process, causing much inconvenience and aggravation to prospective customers passing through the aisle who must pass around the obstacles in the aisle.

Further, the use of a separate cart and ladder type arrangement normally requires two individuals to perform the transportation and stacking arrangement, one individual being on the ladder with the other individual handing the articles from the cart to the individual on the ladder for placing on the display shelves in the proper positions thereon.

Thus, present day carts and systems for the stocking of the shelves of a store or the placing of articles on display shelves and racks for prospective purchasers is a time consuming and expensive procedure, and in view of the low profit margin under which most present day supermarkets operate, it would be highly desirable to provide an improved cart which would minimize the clutter in the aisle during the shelf stacking, minimize the time for such stacking, and reduce the personnel requirement to a single individual for both transporting and stocking the shelves in a minimum of time.

SUMMARY OF THE INVENTION

The present invention recognizes the problems of article transporting and shelf stocking, and provides a novel solution thereto overcoming the deficiencies and disadvantages of presently available carts, ladders, and the like presently used in supermarkets, retail establishments, wholesale establishments, and the like. This is accomplished by providing a novel transportation cart having the article carrying platforms defining a series of steps extending upwardly from the front end of the cart to the back end of the cart, with the articles to be placed on the shelves being first placed on the platforms and then wheeled to appropriate shelves, after which the individual performing the stocking utilizes the platforms in a ladder like manner to reach whatever shelves are necessary, the individual merely bending over to pick up from the platform any items to be placed on the shelves and then merely standing upwards to so place the articles on the shelves, thus eliminating the need for any separate ladder, cart, or any assistance whatsoever for the individual.

It is a feature of the present invention to provide a transportation cart intended for use in the stocking of shelves and the like which permits such stocking to be performed by a single individual in a minimum of time and with a minimum of effort, the cart being movably supported on wheels in a manner to provide a stable base for an individual standing on the cart while still permitting ease of maneuverability of the cart about the aisles of a store, warehouse and the like when going from one location to another location.

Still a further feature of the present invention provides a novel transportation cart intended for use in the stacking of shelves in a supermarket retail establishment, and the like in which the cart is mounted on wheels and provided with readily operable braking brackets adapted to lock the cart in a selected position and prevent further movement thereof until after the braking brackets are moved to an inoperative position.

The provision of a transportation cart, such as briefly outlined above, and possessing the stated advantages, constitutes the principal features of the present invention. The provision of a transportation cart which is relatively simple in its construction and which therefore may be readily manufactured at a relatively low cost and by simple manufacturing methods; one which is relatively devoid of moving parts and which therefore is unlikely to get out of order; one which is rugged and durable and which therefore may be guaranteed by the manufacturer to withstand many years of rough usage; one which is aesthetically pleasing and refined in appearance; one which will occupy a minimum of aisle space and yet provide a maximum area for transportation of articles to desired positions in the aisles and then occupy a minimum of aisle space during the shelf stocking procedure; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a front perspective view of a transportation cart constructed in accordance with the present invention;

FIG. 2 is a front elevational view of the cart;

FIG. 3 is a front end elevational view of the cart;

FIG. 4 is an enlarged fragmentary front elevational view of the braking bracket associated with the back wheels on the cart and showing the braking bracket in the wheel engaging position;

FIG. 5 is a view of the braking bracket similar to FIG. 4 and showing the brake in the inoperative position spaced outwardly from the cart wheel; and FIG. 6 is a cross-sectional view taken along Line 6—6 of FIG. 4.

DESCRIPTION OF THE PREFERRED EMBODIMENT

Referring now to the drawings there is disclosed a preferred form of a transportation cart constructed in accordance with the present invention and designated in its entirety by the reference numeral 10. The cart includes a rectangularly formed frame type base 11 having a back end section 12, a front end section 13, and opposed side sections 14 and 15 respectively. Disposed at longitudinally spaced intervals along each of side surfaces 14 and 15 are vertical posts 16, 17 and 18 each of which is of a different length, post 16 disposed at the juncture of frame end section 13 to frame side section 14 and extending upwardly therefrom a distance less than posts 17 and 18. Post 17 is spaced longitudinally from post 16 and extends upwardly from side section 14 for a length approximately twice the length of post 16. Post 18 is spaced longitudinally from post 17 having its bottom end connected to side section 14 and extending vertically upwardly therefrom a distance approximately three times the length of post 16. It is to be understood that there is disposed on frame side section 15 a series of posts 16', 17' and 18' which are transversely aligned and identical to their mating posts 16, 17 and 18, the transversely aligned sets of posts defining a series of parallel vertical planes longitudinally spaced from each other along the frame 11. Interconnecting the top end of post 16 with the midpoint of post 17 is a horizontal post 19, and similarly interconnecting the top end of post 17 with the midpoint of post 18 is a horizontal post 20, with post 19' and 20' being similarly disposed between posts 16' and 17' and between posts 17' and 18' respectively. To further strengthen the structure there is provided crossing reinforcing rods 21 and 22, rod 21 extending from the junction between posts 18 and 20 to the junction between posts 17 and 14 with rod 22 extending between the junction of posts 18 and 14 to the junction between posts 20 and 17. A similar crossing set of reinforcing posts are provided on the opposite side of the cart 10. Similarly, there is provided a set of crossing reinforcing members 23 and 24, member 23 extending from the junction between posts 17 and 19 to the junction between posts 14 and 16 with member 24 extending between the junction of posts 16 and 19 to the junction between posts 17 and 14. A similar set of crossing reinforcing members are provided at the opposite side of the cart 10. Further, to maintain the rigidity of the cart, there is provided a transversely extending member 25 interconnecting the bottom end portions of vertical members 18 and 18', along with there being provided a transversely extending member 26 interconnecting the bottom end portions of vertical rods 17 and 17'.

To further assist in the rigidity of the cart, there is provided a series of transversely extending spaced apart parallel members extending between the side portions of the cart, a member 27 extending between the bottom ends of posts 16, 16'; a member 28 extending between the top ends of posts 16, 16'; a member 29 extending between the midpoint of posts 17, 17'; a member 30 extending between the top ends of posts 17, 17'; a member 31 extending between the midpoints of posts 18, 18'; and a post 32 extending between the top ends of posts 18, 18'. Further, extending horizontally outwardly from the top end of posts 18 and 18' are horizontal members 35 and 35' respectively terminating in a handle forming transversely extending horizontal member 34, with a transversely extending horizontal member 33 being interconnected between the midpoints of members 35 and 35'.

It is to be understood that the members aforedescribed making up the overall frame of the cart may be of tubular steel, steel angle, aluminum, or any other suitable satisfactory metal material wherein the ends of adjoining sections and members are permanently joined together by welding to form a rigid structure. The preferred embodiment as illustrated utilizes tubular members throughout to make up the frame structure.

Mounted on members 27 and 28 and extending between posts 16 and 16' is a vertical riser 41; mounted between members 28 and 29 and extending between members 19 and 19' is a horizontal platform forming step 44; mounted between members 29 and 30 and extending between posts 17 and 17' is a vertical riser 42; mounted between members 30 and 31 and extending between members 20 and 20' is a horizontal platform forming step 45; mounted between members 31 and 32 and extending between posts 18 and 18' is a vertical riser 43; and mounted between members 32 and 33 and extending between members 35 and 35' is a horizontal platform forming step 46. The risers 41–43 and platform forming steps 44–46 are preferably manufactured of a steel or aluminum material and are covered with a non-skid rubber surface for purposes of safety, the platforms and risers being attached to the respective members and posts by any suitable fastening means, such as by welding, bolts, screws, or the like. In the preferred embodiment, the platforms and risers are welded in position.

Disposed beneath each front end portion of each frame side section 14 and 15 is a pair of tandemly disposed horizontally aligned caster wheels 50 which project vertically downward from the respective side frame section and which are pivotally attached thereto for rotation about a vertical pivot pin 51 to provide swivel type wheels at the front end portion of the cart 10. Mounted adjacent the back end section 12 and disposed beneath each frame side section 14 and 15 at the back end portion thereof are a pair of tandemly disposed horizontally aligned wheels 52 fixedly attached to the respective side frame by brackets 53, the wheels being permanently aligned with the associated side frame section 14 or 15 to form stationary type caster wheels. Disposed intermediate each pair of wheels 52 on each frame side section 14 or 15 is a wheel locking lever 54 pivotally attached to the respective side frame section by a horizontal pivot pin 55 dividing the brake lever into a handle portion 56 disposed upwardly of the pivot point and a wheel engaging portion 57 disposed downwardly from the pivot point. Wheel engaging portion 57 includes a corregated wheel tread engaging portion 58 adapted to be moved into and out of engagement with the tread of an adjacent wheel 52 between an operative braking wheel engaging position and an inoperative position spaced apart from the wheel. To retain the brake lever in either the operative or inoperative position there is provided an arcuately formed flat member 61 having one end 62 connected to the brake lever above the pivot point with the opposite end 63 extending outwardly and curving downwardly therefrom in a manner to cross over the outer surface of the associated side frame section 14 or 15 depending upon which brake lever is being discussed. As seen in FIGS. 4 and 5, and limiting the discussion to frame side section 14 with the understanding that the same discussion is equally applicable to the brake lever 54 provided on frame side section 15, it is noted that the side section 14 is provided with a horizontally extending opening 64 extending out the exterior surface thereof and adapted to detachably receive therein detents 65 or 66 which are formed on member 61 intermediate the ends 62 and 63 with each detent projecting outwardly of the interior surface of the member in a direction toward side frame 14, the detents being of a general conical shape adapted to be received in opening 64 when such detent passes thereover. Detent 65, as shown in FIG. 4, locks the brake lever 54 in the operative wheel engaging position, with detent 66, as shown in FIG. 5, locking the brake lever 54 in the inoperative position spaced apart from the wheel 52.

In addition, an accessory shelf 70 is mounted between members 12 and 25 and extends between frame side sections 14 and 15 and is adapted to receive thereon storage items useful in the stamping and marking of products to be stacked, such as price stamps, name stamps, price tags, and the like which are normally used when the articles are first placed on the cart preparatory to taking them onto the floor to the shelves on which they are to be stacked.

In operation, the articles to be stacked on the shelves are placed on platforms 44, 45 and 46, such as designated generally by article 72, after which the cart is wheeled through the store aisles until reaching the display shelf on which the articles are to be stacked, at which time the individual then applies the brake levers to lock the cart in position adjacent the shelf, with the individual then utilizing the platforms 44–46 in a ladder type manner to stand thereon during the stacking process thus being able to readily reach the products carried on the cart and also readily reach the uppermost display shelf on which the articles are to be placed. In this manner it is not necessary to utilize a separate ladder and a separate transportation cart requiring numerous trips by a single individual in attempting to gather all the necessary paraphernalia for stacking shelves, with the usual procedure requiring two separate individuals to handle all necessary equipment and to stack the shelves, whereas the cart 10 of the present invention provides a device by which a single individual may readily transport the articles to the shelves on which they are to be displayed, and then using the cart as a ladder and climbing up the same on the same platforms on which the articles are being transported, the individual can readily reach such articles to place the same on the shelves.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A transportation cart for supporting articles at preselected heights in accordance with the heights of the shelves to which said articles are to be transferred and subsequently providing steps of consecutively ascending elevations as the lower said articles are sequentially removed therefrom, said transportation cart comprising:
   a. a frame including a rectangular base and having a front end and a back end;
   b. a plurality of horizontal platforms supported by said frame,
   each said platform extending transversely across said frame,
   each subsequently rearward platform being spaced above the adjacent forward platform;
   c. a handle extending rearward from the rearwardmost said platform;
   d. a first pair of spaced support wheels depending from said base proximate the back thereof,
   said wheels rotatable about a common axis which is horizontal in one direction and perpendicular to said frame in the other direction;
   e. a second pair of spaced support wheels depending from said base proximate the front thereof,
   said wheels being rotatable about a horizontal axis and pivotal about a vertical axis; and
   f. selective brake means associated with each of said first pair of support wheels including
      i. an elongate lever having an upper end and a lower end and pivotally connected to said base for rotation about a horizontal axis intermediate said upper end and said lower end,
      ii. a flat arcuate member secured to said lever and having a face abutting said base,
      iii. first and second spaced detents projecting from the face of said arcuate member and arranged to sequentially and operatively engage said base as said lever is rotated about its axis,
      iv. wheel engaging means carried proximate the lower end of said lever, and
      v. handle means proximate the upper end of said lever,
      whereby movement of said handle in one direction urges said wheel engaging means against one of said first wheel and engages said first detent and movement of said lever in the opposite direction spaces said wheel engaging means from said wheel and engages said second detent.

2. The transportation cart of claim 1, further including a horizontal shelf carried by said frame and spaced below the rearmost platform.

3. The transportation cart of claim 1, further including a vertical riser extending between each said adjacent platform.

* * * * *